(12) United States Patent
Williams et al.

US011501118B2

(10) Patent No.: US 11,501,118 B2
(45) Date of Patent: Nov. 15, 2022

(54) DIGITAL MODEL REPAIR SYSTEM AND METHOD

(71) Applicant: Sony Interactive Entertainment Inc., Tokyo (JP)

(72) Inventors: Nigel John Williams, London (GB); Fabio Cappello, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/882,972

(22) Filed: May 26, 2020

(65) Prior Publication Data
US 2020/0387739 A1 Dec. 10, 2020

(30) Foreign Application Priority Data

Jun. 5, 2019 (GB) .................................... 1908008

(51) Int. Cl.
*G06K 9/62* (2022.01)
*G06T 7/521* (2017.01)

(52) U.S. Cl.
CPC ........... *G06K 9/627* (2013.01); *G06K 9/6234* (2013.01); *G06K 9/6256* (2013.01); *G06T 7/521* (2017.01); *G06T 2207/10028* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 10,521,718 B1* | 12/2019 | Szegedy | G06N 20/00 |
|---|---|---|---|
| 2017/0236320 A1* | 8/2017 | Gribetz | G06T 19/006 345/419 |
| 2018/0220048 A1* | 8/2018 | Tamir | G06T 15/04 |
| 2018/0293713 A1* | 10/2018 | Vogels | G06K 9/627 |
| 2018/0341836 A1* | 11/2018 | Lim | G06K 9/6215 |

(Continued)

FOREIGN PATENT DOCUMENTS

| CN | 108198145 A | 6/2018 |
|---|---|---|
| EP | 3407292 A1 | 11/2018 |

OTHER PUBLICATIONS

Combined Search and Examination Report for corresponding GB Application No. GB1908008.4, 6 pages, dated Nov. 13, 2019.

(Continued)

*Primary Examiner* — Nancy Bitar
(74) *Attorney, Agent, or Firm* — Matthew B. Dernier, Esq.

(57) ABSTRACT

A digital model repair method includes: providing a point cloud digital model of a target object as input to a generative network of a trained generative adversarial network 'GAN', the input point cloud comprising a plurality of points erroneously perturbed by one or more causes, and generating, by the generative network of the GAN, an output point cloud in which the erroneous perturbation of some or all of the plurality of points has been reduced; where the generative network of the GAN was trained using input point clouds comprising a plurality of points erroneously perturbed by said one or more causes, and a discriminator of the GAN was trained to distinguish point clouds comprising a plurality of points erroneously perturbed by said one or more causes and point clouds substantially without such perturbations.

13 Claims, 8 Drawing Sheets

(56) References Cited

U.S. PATENT DOCUMENTS

2019/0206071 A1* 7/2019 Yan .......................... G06T 7/50
2020/0265259 A1* 8/2020 Paul ..................... G06N 3/0472

OTHER PUBLICATIONS

Riccardo Roveri, et al., "PointProNets: Consolidation of Point Clouds with Convolutional Neural Networks" EUROGRAPHICS, Computer Graphics Forum, vol. 37, No. 2, 13 pages, Jan. 2018.
Extended European Search Report for corresponding EP Application No. 20174512.2, 9 pages, dated Nov. 4, 2020.
Gurumurthy Swaminathan, et al., "High Fidelity Semantic Shape Completion for Point Clouds Using Latent Optimization" IEEE Winter Conference on Application of Computer Vision, pp. 1099-1108, Jan. 7, 2019.

* cited by examiner

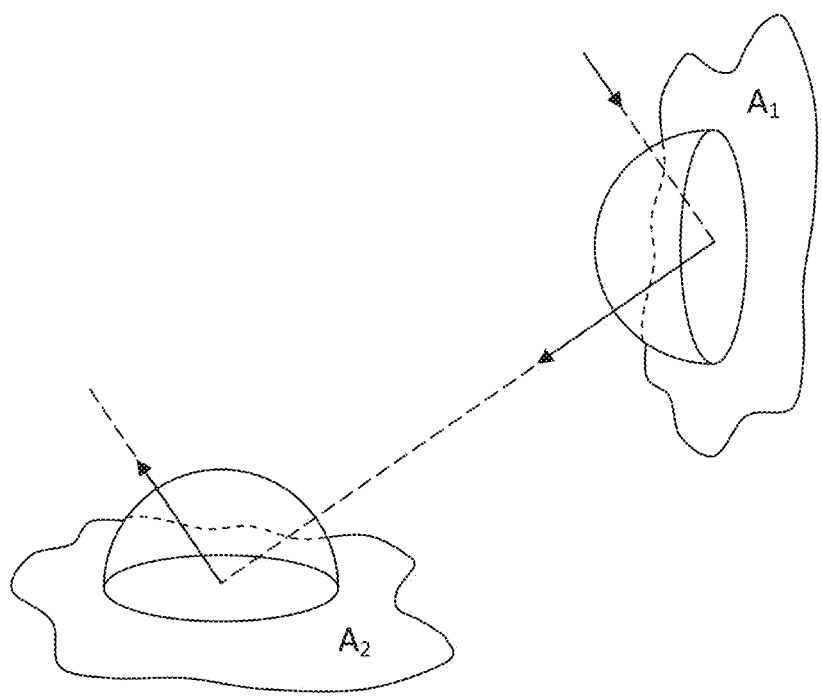

Figure 14

Provide a point cloud digital model of a target object as input to a generative network of a trained generative adversarial network 'GAN', the input point cloud comprising a plurality of points  s1510

Generate, by the generative network of the GAN, an output point cloud in which the erroneous perturbation of some or all of the plurality of points has been reduced erroneously perturbed by one  s1520

Figure 15

DIGITAL MODEL REPAIR SYSTEM AND METHOD

BACKGROUND OF THE INVENTION

Field of the Invention

This disclosure relates to a digital model repair system and method system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In recent years, driven at least in part by the improvements made in display technology, there has been an increase in the demand for interactive content that is able to offer an immersive experience to a user. For example, the increase in the number and quality of virtual reality (VR) and augmented reality (AR) devices lends itself to the provision of immersive experiences, while the development of televisions and other display devices that offer increased resolution, refresh rate, and colour reproduction (for example) also act as increasingly suitable devices for the provision of such content. In addition to this, advances in computing and graphics technology have contributed to the increase in suitable content that may be made available.

While video games may be provided that can offer such an experience, the approaches taken to provide viewer immersion in video games may not be applicable to captured video content such as movies or sports events. For example, when generating video game content it is common that the locations and properties of all objects in the environment are known and other features, such as lighting information, are also able to be calculated. Such information is often not available for captured video content, and therefore techniques applicable to video games to enable the provision of more immersive content are not considered to be widely applicable.

One example of captured video content that is adapted for increased immersion of a user is that of three-dimensional video. Consumer devices are available that are operable to display content that may be viewed (often aided by a corresponding set of glasses that are configured to enable the viewing of three-dimensional content) in a manner that causes the user to perceive the content as having significant depth despite the use of a two-dimensional display.

However, one drawback with such systems is that the viewpoint that is adopted by the user is often pre-defined (such as tied to the camera position in a movie) or severely limited (such as allowing a user to switch between a number of such pre-defined viewpoints).

This may serve to reduce the level of immersion that is experienced by the user when viewing the content, particularly in a VR context, as despite appearing three-dimensional there is no corresponding motion of the viewpoint as the user moves their head as would be expected were the user to move their head when viewing real-world content. The resulting disconnect between the viewpoint and the user's motion can lead to a sense of discomfort for the user, in addition to the loss of immersion.

Similarly, the restrictions placed upon the viewpoint location may be made more noticeable when a user is provided with more immersive content, as the user may be more inclined to try and explore the displayed environment. This can lead to the user attempting to relocate the viewpoint to a desired location in the virtual environment, and becoming frustrated when such a relocation is not possible within the constraints of the provided content. Examples of such changes in viewpoints include a user moving their head in a VR system in order to look around an environment, or an input using a controller or the like in a two-dimensional display arrangement.

It is in view of the above considerations that so-called free viewpoint systems have been developed. The object of such systems is to provide content which a user is able to navigate freely, such that a viewpoint may be selected freely (or at least substantially so) within a virtual environment and a corresponding view is able to be provided to a user. This can enable a user to navigate between any number of viewpoints within the virtual environment, and/or for multiple users to occupy corresponding preferred viewpoints within the virtual environment. These viewpoints may be distributed about an environment in a discreet fashion, or the changing of viewpoints may be a result of a continuous motion within the environment, or content may incorporate elements of each of these.

A number of challenges exist when seeking to provide high-quality image or video content with a free viewpoint. A number of such problems derive from the limitations of the content capturing systems that are used; for example, it may be difficult to capture sufficient image information due to occlusions, image resolution, and camera calibration or the like. In addition to this, information that may be required to generate additional viewpoints (such as lighting information, depth information, and/or information about occluded objects) may be difficult to derive based upon the captured image information. Similarly, limitations of the image capturing arrangement may lead to noisy data being obtained due to a lack of precision; such data may not be suitable for reproduction.

While a number of the problems associated with these issues can be mitigated by the inclusion of a greater number of cameras (or other sensors), this can be rather impractical in many cases. Similarly, addressing these issues by simply increasing the amount of processing that is applied can also be problematic, particularly when live content is being provided, as it may introduce an undesirable latency or require excessive computing power. It is therefore considered that alternative modifications to the free viewpoint content generating may be advantageous.

It is in the context of the above problems that the present disclosure arises.

SUMMARY OF THE INVENTION

In a first aspect, this disclosure is defined by claim 1.

In another aspect, this disclosure is defined by claim 14.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 14 schematically illustrates solid angles on a pair of reflective surfaces; and FIG. 15 is a flow chart of a digital model repair method.

DESCRIPTION OF THE EMBODIMENTS

A number of different approaches for implementing free viewpoint content are considered to be suitable, including photogrammetric, light field/multiscopic, and volumetric approaches. Of course, a number of other approaches (or combinations of the above) may be considered.

The first of these approaches comprises the manipulation of captured images in order to appear three-dimensional; this can add freedom to the viewpoint by enabling the user to peer 'around' an object in the image—this can often be rather limited in scope, but is suitable for a number of purposes. Reprojection of the captured image is often used in methods following this approach, enabling the simulation of the 'correct' view (that is, a view that appears to be from the correct position).

The second approach relies on the capturing of a number of images of the environment from different locations. A free viewpoint experience may then be provided to the user by using interpolation between the captured images; the user is able to manipulate the viewpoint freely within the bounds of the image capture area (that is, the area or volume bounded by the image capture devices).

The third approach that is considered, which is the approach in the context of which the present application is provided, comprises the generation of a virtual scene representing the imaged volume in the content capture process. This may include identifying the geometry of the volume and the objects within it, as well as determining any other parameters (such as lighting effects) as appropriate. Such an approach is discussed in 'Multi-View Stereo: A Tutorial' (Y Furukawa, C Hernandez, Foundations and Trends in Computer Graphics and Vision, Vol 9, No. 1-2, 2013), the contents of which are incorporated by reference.

While the present application is framed within the context of the volumetric approach to free viewpoint content, it is considered that the techniques discussed within may be applicable to one or more other approaches.

Figure 1:
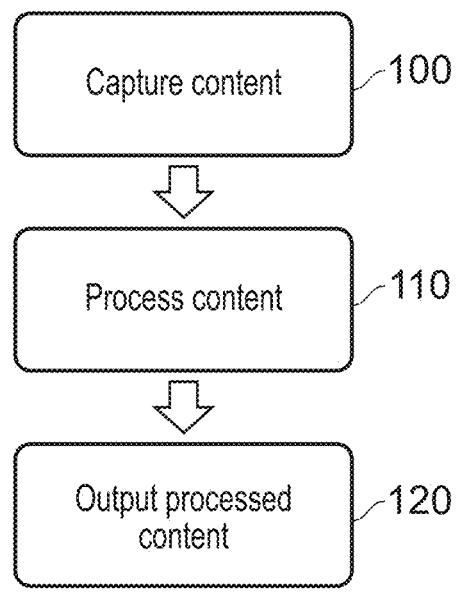
FIG. 1 schematically illustrates a free viewpoint generation and output method.

Referring now to the drawings, wherein like reference numerals designate identical or corresponding parts throughout the several views, FIG. 1 schematically illustrates a method for capturing and generating free viewpoint content, in line with the third approach described above.

A step 100 comprises capturing the content. The content capturing process includes the use of image sensors, such as cameras, and may further include the use of microphones or the like for capturing audio. While in some cases the captured image content may be entirely two-dimensional, in other cases the content capturing process includes the capturing of depth information for a scene—this can be achieved using stereoscopic or depth cameras, for example, or any other method for determining the distance to an object in the capture environment. Examples of content capturing arrangements are described below with reference to FIGS. 2 and 3.

A step 110 comprises performing processing on the captured content, with the aim of generating content that a user is able to use to explore the captured environment with the aid of a free viewpoint. Examples of processing include the estimating of the depth of objects within the captured images, and the encoding of the processed data into a suitable format for storage and/or output to a viewer. Each of these is discussed below with reference to FIG. 5.

The processed data comprises a three-dimensional representation of the environment for which the content capture is performed (or is sufficiently complete so as to enable the generation of such a representation). This representation may be able to be distributed to a user to enable them to generate free viewpoint experiences locally, or it may be able to be used (for example, at a server) to generate image frames in accordance with a viewpoint defined by a client device.

A step 120 comprises the output of the free viewpoint content to a viewer. This may be performed in a number of different ways; for example, the viewer may request a particular viewpoint from a server which holds the encoded data. The server may then generate images representing the viewpoint at the requested position, and transmit this to the viewer. In some embodiments, the viewer may instead be provided with encoded data for the whole (or at least a part of) the captured environment such that processing for generating image content is performed locally.

Figure 2:
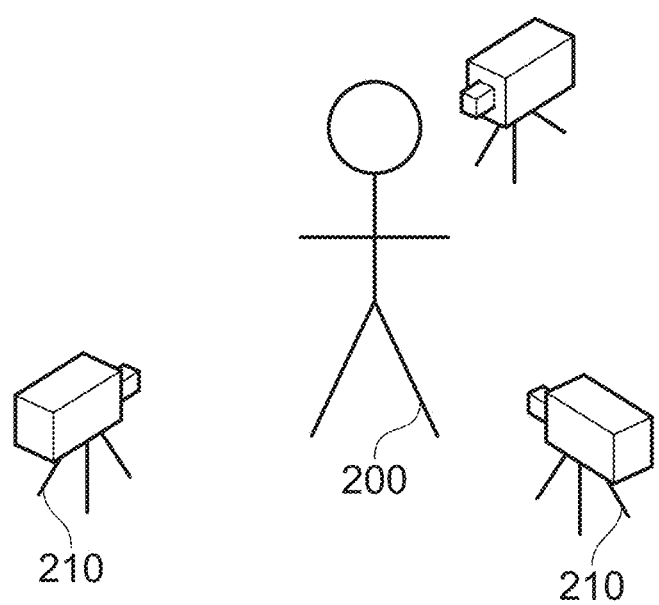
FIG. 2 schematically illustrates a content capture arrangement.

FIG. 2 schematically illustrates a content capture arrangement that may be used to implement step 100 as described with reference to FIG. 1.

In this Figure, a plurality of cameras 210 are arranged so as to capture images of a person 200 (such as an actor in a movie) from a range of different angles. The cameras 210 may also be configured to capture audio in the environment, although this may instead be captured separately. In some embodiments it is advantageous to be able to synchronise the cameras or establish the timing offset between their image capture—this may assist with generating a high-quality output for a user.

Between them, the cameras 210 may be arranged so as to be able to capture images of a significant proportion of the environment and objects within the environment. In an ideal scenario every part of every surface within the environment is imaged by the arrangement of cameras, although in practice this is rarely possible due to factors such as occlusions by other objects in the environment. Such an issue may be addressed in a number of manners, a selection of which is discussed below.

For example, the arrangement of cameras 210 as shown in FIG. 2 may be suitable for capturing images of the user from a number of angles—but the side of the person 200 facing away from the cameras may not be well-imaged, leading to a lack of information for this area. A number of techniques may be used to mitigate this problem, some of which will be discussed below.

Figure 3:
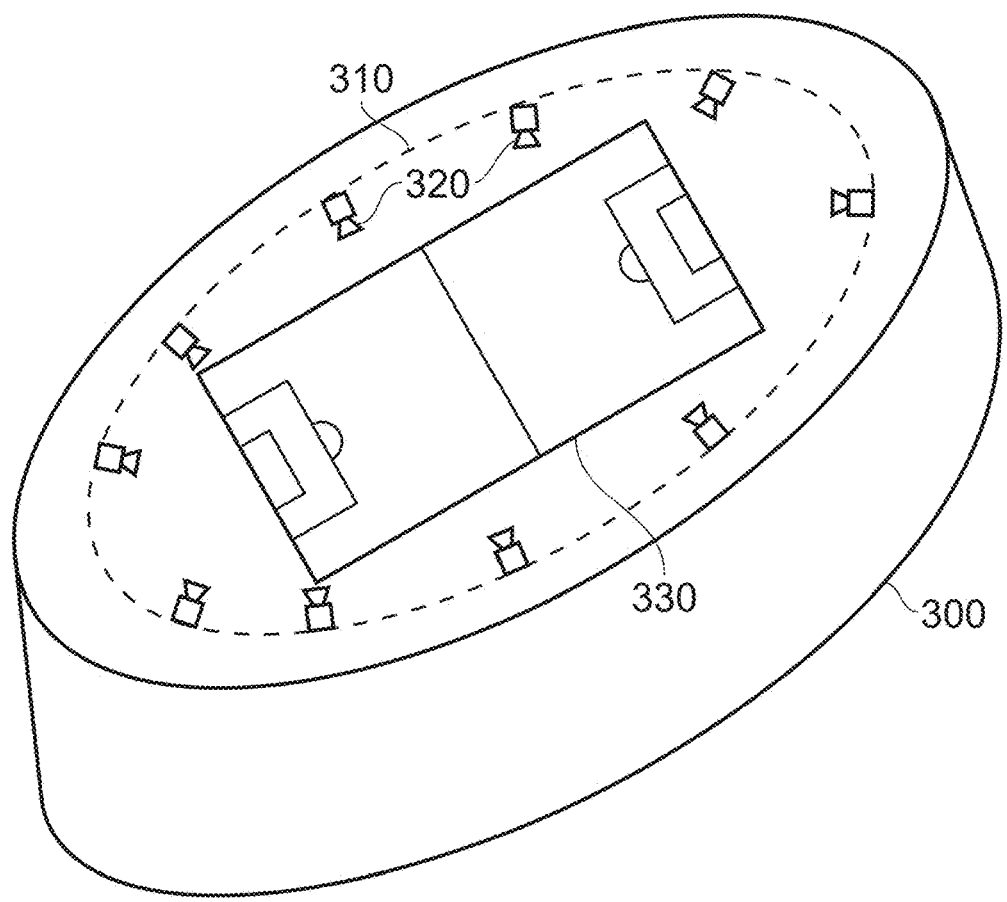
FIG. 3 schematically illustrates an alternative content capture arrangement.

FIG. 3 schematically illustrates an alternative content capture arrangement that may be used to implement step 100 as described with reference to FIG. 1. As is apparent from FIG. 3, this is a configuration that may be more suited for the capturing of large-scale events, such as sports matches, rather than individual people—although of course such an arrangement could be scaled down to an environment smaller than a sports stadium as appropriate.

FIG. 3 comprises a stadium 300 which has a fixture 310 that substantially follows the shape of the stadium 300. A plurality of cameras 320 are supplied on this fixture 310, and may be angled so as to capture images of events within the stadium 300; this may include the action on the pitch 330, the sidelines, or even the crowd. The number of cameras, and the properties of each camera, may be selected freely in order to provide a suitable degree of optical coverage of the environment. For example, a set of 40 cameras each with 4K resolution and arranged so as to be able to collectively image the whole pitch 330 may be provided.

Figure 4A:
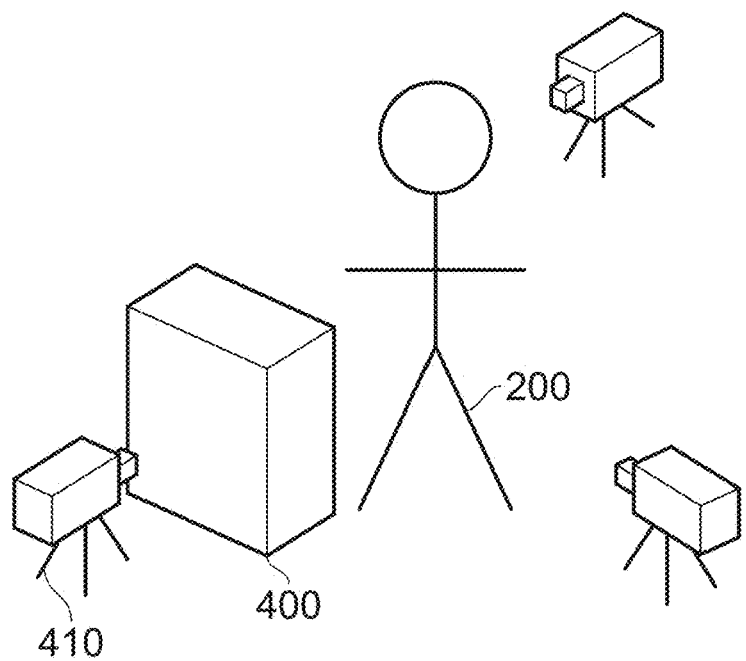
FIGS. 4a and 4b schematically illustrate an occluded content capture arrangement.
Figure 4B:
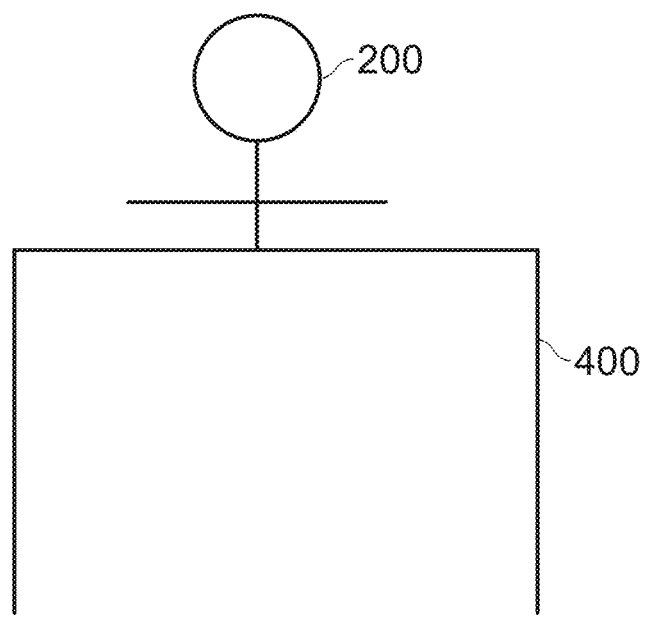

FIGS. 4a and 4b schematically illustrate an occlusion problem that may arise when capturing content in line with step 100 of FIG. 1.

FIG. 4a schematically illustrates an occluded content capture arrangement; this is the content capture arrangement of FIG. 2, with an additional object 400 in the capture environment that prevent the camera 410 from correctly imaging the person 200. Of course, while shown as an inanimate object the object 400 could be anything that blocks the camera's view—such as other people, cameras, or even inclement weather.

FIG. 4b schematically illustrates a viewpoint from the camera 410 of FIG. 4a. It is apparent from this Figure that the camera is no longer able to capture images of the lower half of the person's 200 body due to the occlusion by the object 400. This may lead to incomplete information about this area of the environment, which can cause problems in a free viewpoint arrangement—if a user moves the viewpoint to the other side of the object 400 there would not be sufficient information to generate a view of the person 200.

In some cases, the camera system for capturing images of the environment may be robust to such occlusions—for example, given enough cameras it is possible that the arrangement leads to every part of the environment (or at least a sufficient number of parts of the environment) being imaged by more than one camera. In such a case, it is possible that images of an area occluded from one camera's view are captured by another camera.

Alternatively, or in addition, a number of processing techniques may be used to fill such gaps. For instance, information about that area (such as the colour of the trousers worn by the person 200) may be stored from previously captured frames, or determined in dependence upon other information—for example, it may be assumed that the colour is constant (either over time, spatially, or both), and so any image of the trousers may be enough to supply the colour information despite being captured at a different time, and/or imaging a different portion of the trousers. Similarly, the colour could be input by an operator or the like.

Figure 5:
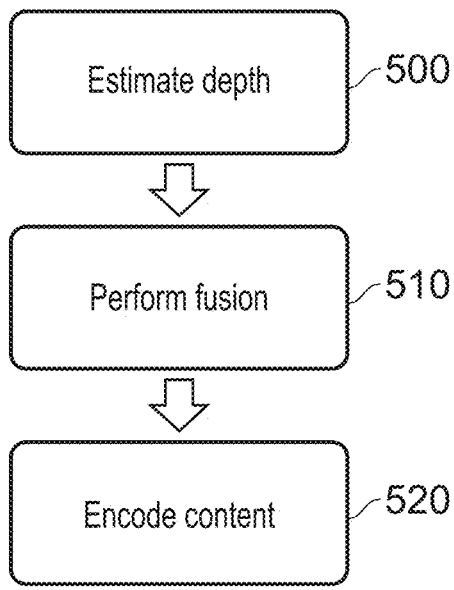
FIG. 5 schematically illustrates a content processing method.

FIG. 5 schematically illustrates a content processing method, which may be implemented as an example of the processing performed in step 110 of FIG. 1. Of course, any suitable processing may be performed in the step 110; it is not limited to that shown in FIG. 5, nor must every step of FIG. 5 be performed.

A step 500 comprises an estimation of the depth of one or more parts of the environment that is imaged. In some cases, this may be performed by identifying the disparity associated with an object between a pair of stereoscopic images; in other cases, monoscopic depth detection may be performed, or a position may be estimated from a number of images based upon knowledge about the position and orientation of the cameras used to capture those images.

A step 510 comprises the fusion of image data. Fusion of image data is the process of combining the information that is obtainable from each of a plurality of images in order to generate a three-dimensional space using images in a two-dimensional space. For example, image data may be fused so as to generate a three-dimensional model of an object that comprises two-dimensional information about each side of the object, as imaged by a corresponding plurality of cameras. This is discussed below in more detail, with reference to FIGS. 6 and 7.

A step 520 comprises the encoding of the processed image data, for example to generate data that is in a format that is suitable for storage and/or transmission to a user. Examples of suitable representations of the content include the use of point clouds and/or meshes to represent objects and features in the environment. For instance, a point cloud may be defined that describes the location of points on the surface of each of a number of objects/environmental features. When rendering an image, a viewpoint within the virtual environment may be defined and the point cloud is consulted to determine which objects (points) fall within the viewing frustum—once this is determined, corresponding texture information may be applied to generate a view within the virtual environment.

Further processing may also be performed in addition to, or instead of, one or more of the steps shown in FIG. 5. For example, segmentation may be performed so as to determine which elements of a captured image correspond to distinct objects and which elements form the background. Hole-filling or completion processing may also be performed, which is processing that seeks to identify where information about the environment is missing and to approximate information that may be desired, but is not present in the captured information.

As discussed with reference to step 510, fusion of image data may be performed in order to generate a more complete description of the environment in which image capture is performed. For example, image data from a second camera may be used to supplement the image data from a first camera, which can mitigate the problem of occlusion.

In general, fusion techniques utilise a number of captured images that each capture an image (a two-dimensional image and depth information) of the environment, the images being captured at different times or from different camera positions. These images are then processed to extract information to enable a three-dimensional reconstruction. An example of such a process is discussed below.

At a first stage, segmentation is performed. This process results in a separation of an imaged object and a background of the image from one another, such that the background may be removed from the image. The segmented image of the object, in conjunction with the depth data that is captured, can then be used to generate a three-dimensional image of the object from one side, where every pixel of the image represents a point in three-dimensional space.

By generating multiple such images from a number of viewpoints, three-dimensional images may be generated for an object from a number of different sides; this can enable the construction of a full three-dimensional volume representing the external shape of the object. The fusion process here is used to correlate matching points as captured by the different cameras, and to remove any erroneous points, so as to enable a combination of the captured three-dimensional images into a three-dimensional representation.

Figure 6:
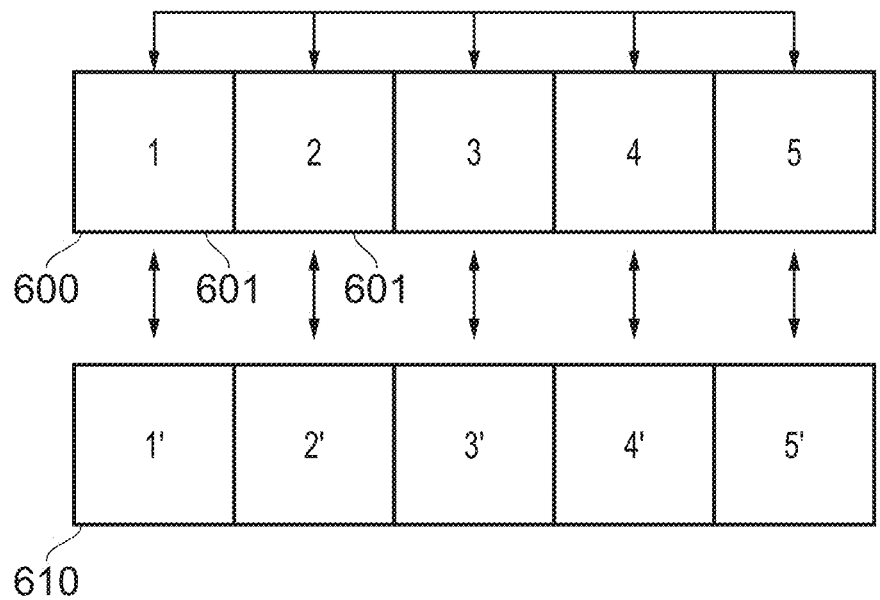
FIG. 6 schematically illustrates image fusion schemes.

FIG. 6 schematically illustrates examples of such fusion. A first image data set 600 and a second image data set 610 are shown, which correspond respectively to image data captured by a first and a second camera. Each of the image data sets comprises a number of consecutive frames 601.

Temporal fusion is a fusion technique that may be performed within a single image data set (that is, an image data set captured by a single camera over a time duration). In FIG. 6, this is shown with respect to the image data set 600, wherein information from the frames 601 (labelled 1-5) may each be used to supplement data from the other frames. Temporal fusion may be advantageous when there is motion of objects within the environment; occlusions may vary between the image frames captured by a single camera, and therefore image data from earlier- or later-captured frames may be suitable to fill gaps (such as those due to occlusion) in the data for a given image frame.

Spatial fusion may be performed between the two image data sets 601 and 610 (that is, image data sets captured by cameras located at different viewpoints); for example, image data from the frame labelled 1' may be used to supplement the image data derived from the frame labelled 1. This may be performed for any pairing of image frames, rather than necessarily being limited to those captured at (at least substantially) the same time. Spatial fusion is advantageous in that the image data from each of the image data sets is obtained from a different position—different views of the same object may therefore be captured.

Figure 7:
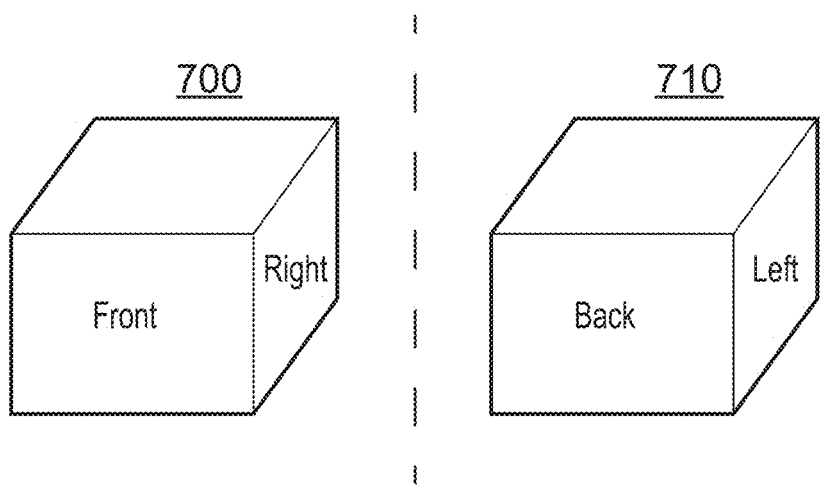
FIG. 7 schematically illustrates image frames for performing image fusion.

FIG. 7 schematically illustrates an example of two image frames 601, each imaging the same object. In the first, labelled 700, the front, top, and right portions of the object can be seen by an image capture device. In the context of FIG. 6, the image 700 may correspond to the image frame labelled 1 in the image data set 600.

In the second, labelled 710, the back, left, and top portions of the object can be seen by an image capture device. In the context of FIG. 6, the image 710 may correspond to the image frame labelled 1' in the image data set 610. This view would therefore represent a view of the object as captured by a different image capture device that is provided at a different location. Alternatively, the image 710 may correspond to the image frame labelled 5 in the image data set 600. This view would therefore represent a view of the object as captured by the same image capture device but at a later time, this time difference being sufficiently long that the object has rotated (or the camera has moved).

In either case, the data from each of the images 700 and 710 may be combined so as to generate a more complete description of the imaged object than would be available using only a single image frame comprising the object. Of course, any suitable combination of spatial and temporal fusion may be used as appropriate—the fusion process should not be limited to the specific examples provided above.

It should be appreciated that the segmentation-based approach used in the example above is non-limiting; other methods may be suitable. For example, a truncated signed distance function (TSDF) may be used to represent a scene volumetrically, with this representation being used for integrating multiple images of the scene captured from different viewpoints.

At the conclusion of the method described with reference to FIG. 5 (or an equivalent processing of the captured data), it is anticipated that the captured content has been converted into a form that enables the generation of a viewpoint at any (or at least at a substantial number of) locations within the captured environment.

Figure 8:
FIG. 8 schematically illustrates a data structure.

FIG. 8 schematically illustrates an exemplary data structure for the storage of the generated content; the stored generated content may be referred to as free viewpoint data. In this data format, a file 800 comprises point cloud information 810, texture information 820, and additional information 830. Of course, an alternative data structure may be provided, as is appropriate for the format of the generated content.

The point cloud information 810 may comprise sufficient data to enable to reproduction of the entire virtual environment, or at least a portion of that environment. For example, a different set of point cloud information 810 may instead be generated for each of a plurality of areas within the virtual environment—such as on a per-room basis.

The texture information 820 complements the point cloud information 810, such that textures are provided that correspond to each of the surfaces that are able to be described using the point cloud information 810. As noted above, the texture information is applied to the geometry described by the point cloud within a viewing region (defined by the viewpoint within the virtual environment) as a part of the rendering process. The textures can be stored in any suitable image format, for example.

The additional information 830 may comprise identifying information for the data structure (such as identifying the virtual environment that is represented by the included data). Alternatively, or in addition, information assisting with the reproduction of a virtual viewpoint within the virtual environment described by the point cloud information 810 may be provided; examples include lighting information for the environment. Any other suitable information may also be included as appropriate, such as object identification information or sound source information for the virtual environment.

As noted above, this information may be provided to the user in a raw form including data (such as a point cloud representation of the environment, in addition to texture and lighting information) for the whole of the environment. However, this represents a significant amount of data to transmit and store (point clouds may comprise millions or even billions of data points) and may therefore be inappropriate in a number of scenarios.

As an alternative, this information may be provided to a viewer by generating an image at a server in response to an input viewpoint position/orientation. While this may introduce an increased degree of input latency, it may be responsive enough to provide a suitable free viewpoint experience to a user.

In either case, rendering of a viewpoint must be performed based upon the encoded data. For example, when using a point cloud representation to store information about the captured environment the rendering process comprises a surface reconstruction process as a part of generating an image for display. This is performed so as to enable to generation of surfaces from a set of discrete points in the point cloud.

Figure 9:
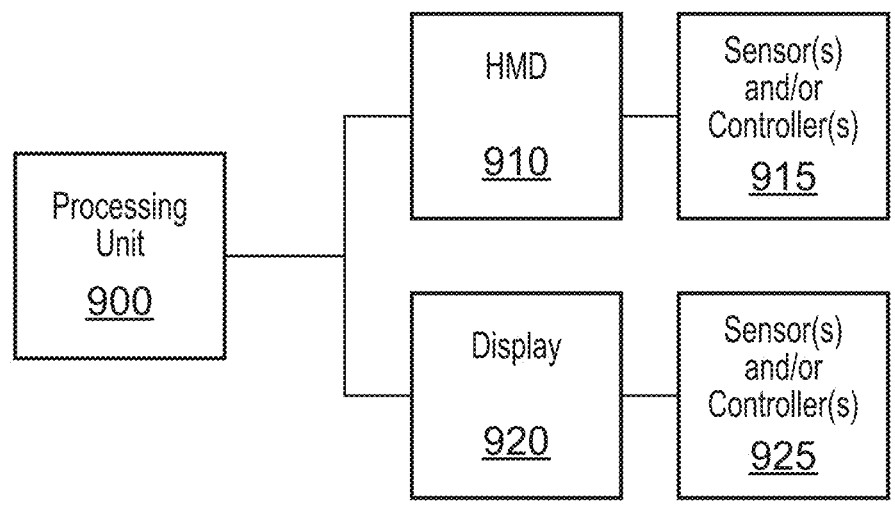
FIG. 9 schematically illustrates a content generation and display system.

FIG. 9 schematically illustrates a content generation and reproduction system. This system includes a processing unit 900, an HMD 910, and a display 920.

Figure 10:
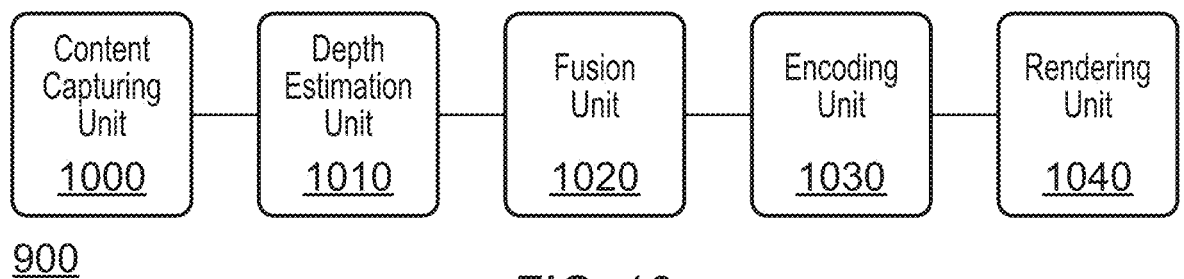
FIG. 10 schematically illustrates a processing unit.

The processing unit 900 is operable to generate content (for example, by using the method discussed with reference to FIG. 1), and to render a desired viewpoint for display to each of one or more users within the generated content. An exemplary arrangement of units within the processing unit 900 is shown in FIG. 10 and discussed below.

The desired viewpoint may be determined in any of a number of ways; for example, the HMD 910 may be associated with one or more position and/or orientation sensors 915 that enable the user's head motion (or any other suitable motion) to be used as an input to control the motion of the desired viewpoint. Alternatively, or in addition, the viewpoint may be controlled via inputs to a controller 915. Similarly, inputs to control the viewpoint may be provided via a control pad (such as a game controller) that is associated with one or more of the displays 910 (via the controller 915) and 920 (via the controller 925) and/or the processing unit 900.

In any case, the viewpoint may be controlled in a three-dimensional manner such that the user can move the viewpoint freely (or at least substantially freely) within the virtual environment, as well as modify the orientation of the viewpoint within the virtual environment defined by the free viewpoint data.

The HMD 910 and display 920 (such as a television, mobile phone or computer monitor) are operable to display content rendered by the processing unit 900. Each of these may be used independently, such that the other device does not display content at all, or in combination; for example, the displays may show the same content (with one of the display devices acting as a spectator screen, for example) or may show different viewpoints within the same virtual environment. Of course, the number of displays (head-mountable or otherwise) may be selected freely, rather than being limited to one of each type of display.

FIG. 10 schematically illustrates the processing unit 900, as described above with reference to FIG. 9. The processing unit 900 comprises a content capturing unit 1000, a depth estimation unit 1010, a fusion unit 1020, an encoding unit 1030, and a rendering unit 1040.

The content capturing unit 1000 is operable to control the content capture process; for example, this may comprise the control of one or more imaging units and/or audio capture units to generate information about a real environment. Such a process is described above with reference to step 100 of FIG. 1.

The depth estimation unit 1010 is operable to perform a process to generate estimates of the depth of one or more parts of the environment of which images are captured. This may comprise the use of any suitable depth estimation technique, and may use information about the locations of the content capturing devices. For example, this may comprise identifying the disparity between stereoscopic image pairs for an imaged feature. A depth estimation process is described above with reference to step 500 of FIG. 5.

The fusion unit 1020 is operable to perform an image fusion process so as to enable the generation of a coherent virtual representation of the real environment. This may include the generation of three-dimensional representations of imaged objects/features within the real environment. A fusion process is described above with reference to step 510 of FIG. 5.

The encoding unit 1030 is operable to generate data that is in a format that is suitable for the generation of images for display to a user, where those images may be generated for any viewpoint within the virtual environment. In some embodiments, the selected encoding method may be selected in dependence upon the desired transmission/storage methods. For example, if the encoded content is to be transmitted (such as to a separate rendering device via a network) the encoding method may be selected so as to either increase compression or reduce individual file size (such that files can be sent on an as-required basis). A content encoding process is described above with reference to step 520 of FIG. 5.

The rendering unit 1040 is operable to render images of the virtual environment for output to one or more displays (such as the HMD 910 and/or display 920 of FIG. 9). For example, the rendering process may comprise receiving a desired viewpoint (which may be determined based upon user inputs), identifying the regions of the point cloud that appear within the frustum defined by the desired viewpoint, and applying the corresponding textures to those point cloud regions.

In some embodiments, the processing unit 900 is instead not operable to generate the content, but is operable only to reproduce the content for display. For example, the content may be generated elsewhere and information (such as in the form of a file as discussed with reference to FIG. 8) may be provided to the processing unit 900 to enable a desired viewpoint to be rendered upon request for output to one or more display devices 910 and 920.

Of course, in some embodiments it is envisaged that the processing unit 900 may simply act as an intermediate device for accessing content from a server and providing it to the one or more displays 910 and 920. For example, rendered content could be provided to the processing device 900 by a server in response to uploaded information about a requested viewpoint; such content may then be transmitted to one or more displays 910 and 920. Similarly, the processing unit 900 may be omitted altogether in embodiments in which the HMD 910 and/or display 920 are able to communicate with the server directly.

Figure 11:
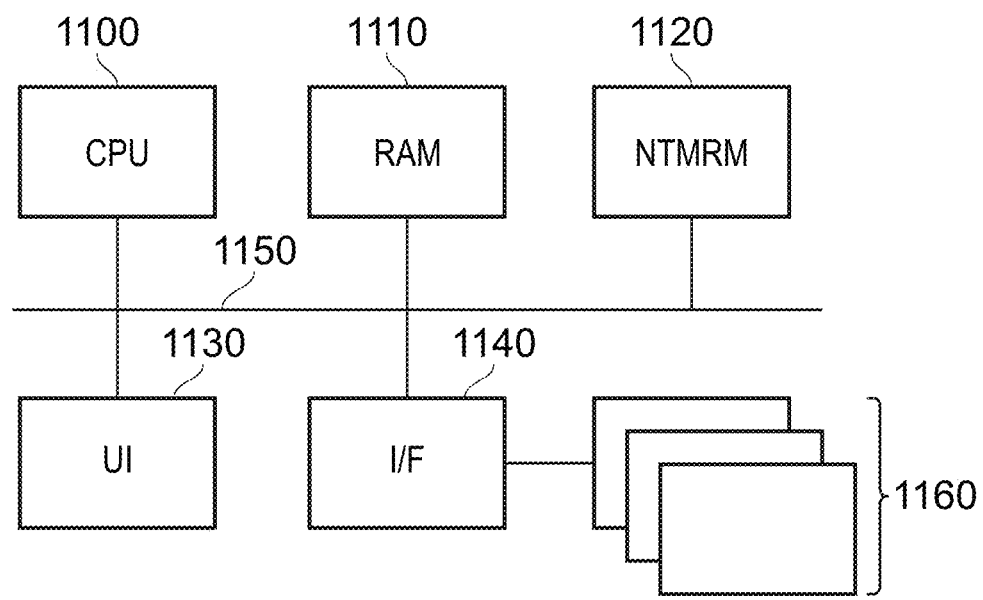
FIG. 11 schematically illustrates a data processing apparatus.

FIG. 11 schematically illustrates a data processing apparatus suitable to carry out the methods discussed above and in particular to implement one or both of the free viewpoint data generation technique(s) and the image viewing or presentation technique(s) outlined above, comprising a central processing unit or CPU 1100, a random access memory (RAM) 1110, a non-transitory machine-readable memory or medium (NTMRM) 1120 such as a flash memory, a hard disc drive or the like, a user interface such as a display, keyboard, mouse, or the like 1130, and an input/output interface 1140 linked to peripherals 1160 such as a camera, a display and a position and/or orientation and/or motion detector by which a current viewpoint (in a display mode) may be controlled. These components are linked together by a bus structure 1150. The CPU 1100 can perform any of the above methods under the control of program instructions stored in the RAM 1110 and/or the NTMRM 1120. The NTMRM 1120 therefore provides an example of a non-transitory machine-readable medium which stores computer software by which the CPU 1100 performs the method or methods discussed above.

As described above, captured content may be represented as point clouds describing the location of points on the surface of each of a number of objects/environmental features.

Point clouds are typically generated from a combination of image data and depth information, and may be captured for example by use of a stereo camera (providing image and disparity information), a time-of-flight camera (directly measuring distance to target objects within the scene), and the use of one or more cameras with a structured light projection (for example in the near infrared), where the viewed deformation of a known light pattern projected onto a surface is indicative of the topology of that surface.

However, it will be appreciated that such capture processes may not be perfect and so the resulting point clouds may comprise errors, typically in relation to the location of points on the surface of a captured object.

A non-exhaustive list of such errors includes:

Gaussian noise, due to random errors in the sensing process;

flying pixels, which are outliers that have a very significant deviation from the correct surface shape; these usually are caused by a lack of texture in stereo images, causing positional mismatches when estimating disparity and hence depth (e.g. depth estimation error);

over smoothing, which may occur near boundaries between foreground and background objects or more generally at any occlusion boundary, because whilst there should be a sharp boundary between foreground and background, instead there is a blending, with points that should be part of the foreground going to the background and vice-versa; often this is due to the image resolution being greater than the depth sampling resolution. More generally, such errors may be described as 'noise', with different sources of error/noise typically having different statistical characteristics.

Although these errors may have typically consistent qualities at a statistical level, they can nevertheless be difficult to detect with traditional, non-domain specific techniques.

Accordingly, in an embodiment of the present invention a generative adversarial network (GAN) may be trained to learn about the three-dimensional distribution of points.

Figure 12:
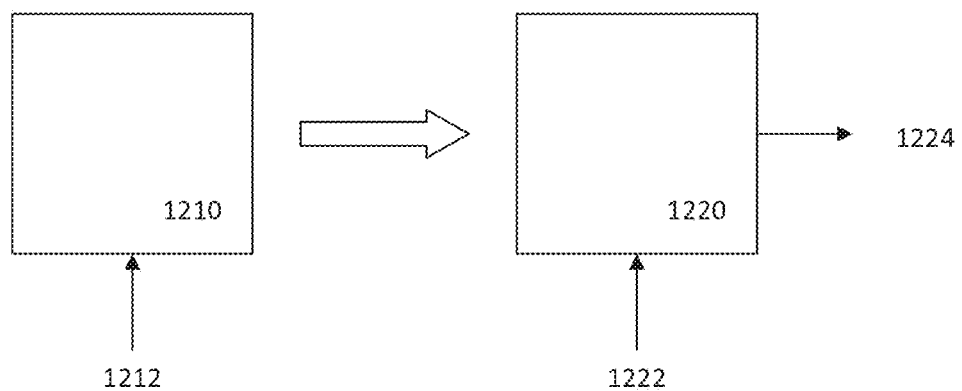
FIG. 12 schematically illustrates a generative adversarial network or GAN.

Turning now to FIG. 12, a generative adversarial network comprises two neural networks; a generative network 1210, which can model the probability of features, and a discriminative network 1220 that can act as a classifier of features. The generative network thus learns to output data with target features, whilst the discriminative network learns to distinguish candidates produced by the generative network from true target data, based on such features.

The process can be characterised as an arms race in which each network learns to do its respective task better as the other improves; the generative network's training objective is in effect to increase the error rate of the discriminative network, by making this incorrectly classify outputs of the generative network as true output data, whilst the discriminative network's objective is to minimise this error rate by becoming a better discriminator—thereby forcing the generative network to slowly improve its performance.

The discriminator is initially trained on real target data 1222 (sometimes referred to as 'ground truth' data), until it can identify this with acceptable (predetermined level of) accuracy (e.g. as a classification output 1224, optionally with a confidence value).

Meanwhile, the generator typically operates to transform a random distribution of input values 1212 into the features of the target data, with the result being evaluated by the discriminator. Hence for example referring to FIG. 13, this illustrates the output of a generative network that has learned to generate a three-dimensional distribution of points over the surface of a sphere, where the input to the generative network is a set of random three-dimensional points, and the output is the same set of points converged to a distribution across the surface of the sphere.

The discriminator and the generator are then trained based on their errors, typically using back-propagation if for example the generator is a deconvolutional neural network and the discriminator is a convolutional neural network.

It will be appreciated that the general principles of generative adversarial networks will be known to the skilled person, and so are not discussed in further depth here.

In embodiments of the present invention, the intention is to improve (e.g. de-noise or rectify) at least part of a point cloud that comprises errors/noise of the kinds discussed previously herein.

Accordingly, to train a suitable discriminator network, the 'ground truth' may be based on synthetic, error-free point clouds (for example based on 3D models, or based on point clouds that have been manually corrected, or de-noised using computationally expensive techniques). These point clouds may be error-free or at least substantially error free, accepting that a residual level or error may remain even in the case of manually corrected point clouds. A number of different 3D models and views may be provided to improve generalisation within the discriminator. In addition to the error-free point clouds, information relating to occlusion boundaries can be deduced from the original 3D models.

Clearly also, where the nature of real-world objects that are likely to be the subject of content capture is known or can be anticipated, then synthetic or previously corrected point clouds representing such objects may (also) be included in the training set. Likely real world objects include but are not limited to human faces and also flat surfaces such as walls. Both are likely to feature in many captured scenes, and errors in the surfaces of either are particularly noticeable. Clearly however, other shapes are also commonplace, including human bodies and a wide variety of everyday objects, and any of these may be considered for training purposes. Alternatively or in addition, 3D models of geometric primitives, and/or parts thereof, may be used to generate synthetic point clouds; planes, cylinders, spheres, ovoids, cubes and the like and parts thereof feature widely within manufactured objects, and so training a discriminator on these may further assist with generalisation.

In addition to training on error-free point clouds, the discriminator is also trained on point clouds comprising errors of the kinds described previously herein (Gaussian noise, flying pixels, over smoothed boundaries and the like), in order to distinguish between the two classes; some or all of the synthetic error-free point clouds can be artificially perturbed according to one or more of the above error schemes to create noisy point clouds against which to learn to discriminate. In this case, information about the occlusion boundaries may be used to determine where to add over smoothing errors; meanwhile flying pixels at random locations and Gaussian noise at some or all locations may also be added.

The discriminator network can thus learn, to an acceptable degree of accuracy, to classify noisy and noise free point clouds.

The generative network is then trained to output point clouds that the discriminator network cannot distinguish from error-free point clouds, using generative adversarial network training techniques.

Notably, whilst normally such a generative network may be trained based upon a random distribution of input values, in embodiments of the present invention the input is a representation of a point cloud comprising noise/errors such as those listed previously herein.

Hence the generative network is trained to receive a noisy point cloud, and output a noise-reduced (ideally, error-free)

point cloud, as a consequence of being trained to cause the discriminator to classify the output as a genuine error-free point cloud.

Optionally, the generative network may output a point cloud that corresponds to a subsection of the input point cloud; hence for example a noisy input of the head or bust of a person may result in the output of just the face of that person. In this case the discriminator would also operate on this subsection.

In either case, the generative network learns rules to de-noise or rectify outlying points in the point cloud (or part thereof), where these diverged from expected positions either as a function of Gaussian noise, random depth estimation error, or over smoothing.

Optionally, a generative network may be trained on inputs of just one type of noise, or may be trained on two or more types of noise, as the type of noise may be characteristic of the type of sensor(s) used to capture the original content and so training more specific to the subset of noise types associated with the chosen capture technique may be advantageous.

In either case, the range of noise (i.e. the degree of perturbation) may be modelled on real-world observations (for example, Gaussian noise has a well understood distribution, whilst flying pixels may have a uniform distribution, or may have a distribution that reflects the cause of the error, such as tiling pitch in repeated patterns). Subsequently, if the GAN is provided with noisy point clouds obtained from a real-world sensor, the GAN can train further to more precisely model any characteristic distribution attributable to the sensors that the GAN is fed by.

The input data may also comprise additional random points, whose purpose is to be remapped to fill one or more gaps in the surface distribution. These random points can be added in a manner similar to the other forms of noise in the training data, e.g. simulating perturbations of non-existent points in the input point cloud.

Typically the generative network is initially trained using the same artificially perturbed point cloud used to train the discriminator, and/or a complementary training set generated in the same manner.

Subsequently, the generative network is provided with real-world point cloud data to be de-noised in this manner. Optionally one or both of the generative network and discriminator network may continue to be trained and refine their output at this stage, for example in order to account for any differences output caused by qualitative differences in the input to the generative network.

When the discriminator suggests that the output of the generative network is a real point cloud, either as a binary decision or based on a predetermined threshold of confidence, then the output of generative network may be considered to be de-noised or rectified to a satisfactory degree.

Variant training schemes may also be considered; in one optional variant scheme, because the initial training data is artificial, the generative network may be provided with both the error-free and artificially perturbed point clouds as inputs, optionally with the error-free point cloud slightly rotated, scaled and/or distorted/warped (for example by a couple of degrees rotation on one or more axes, a couple of percent scale up or down, or a couple of percent skew). The generative network therefore has a model of the error-free point cloud, but optionally cannot simply attempt to use that as a direct output to beat the classifier due to the applied transformation(s). This provides a generative network with more information with which to form a de-noising transformation.

Subsequently, when the generative network is operating on point clouds derived from successive video frames and depth data, the generative network's own de-noised output corresponding to the previous frame can be provided as the additional notionally error-free input to accompany the noisy point cloud associated with the next video frame; in this way to the extent that there is continuity between video frames, a previous output can assist with the correction of the current input.

In this scenario, optionally the very first video frame may be accompanied by a duplicate of the noisy point cloud, or a version of noisy point cloud that has been de-noised to a first approximation using classical techniques; the output may be less accurate than normal, but will be a better input to the next frame, and so on until the output and hence subsequent input is roughly optimal for the current state of the generative network.

Alternatively or in addition, in another optional variant scheme the error-free point clouds are perturbed as before to create input training data, but this noisy training data is then duplicated and separately processed before being used as the target or ground truth data.

In this case, the noisy point clouds are processed using the so-called winding number approach (http://www.dgp.toronto.edu/projects/fast-winding-numbers), which also aims to remove outliers and noise, and also fill in missing gaps in the cloud.

The GAN will then train the generative network to implicitly learn the winding number approach, by virtue of taking noisy inputs and targeting a discriminator trained on the results of applying the winding number technique to those noisy inputs.

A further variant takes a different approach, which is focused on improving a distribution of sample points. In effect, the above approaches comprise training a GAN to redistribute sample points in a point cloud that exhibit positional deviations typical of one or more noise types (depending on how the GAN is trained). In doing so, the GAN is learning/postulating a point distribution method (that selectively operates, or operates most, on within a cloud whose position is at least partially attributable to noise).

Figure 13:
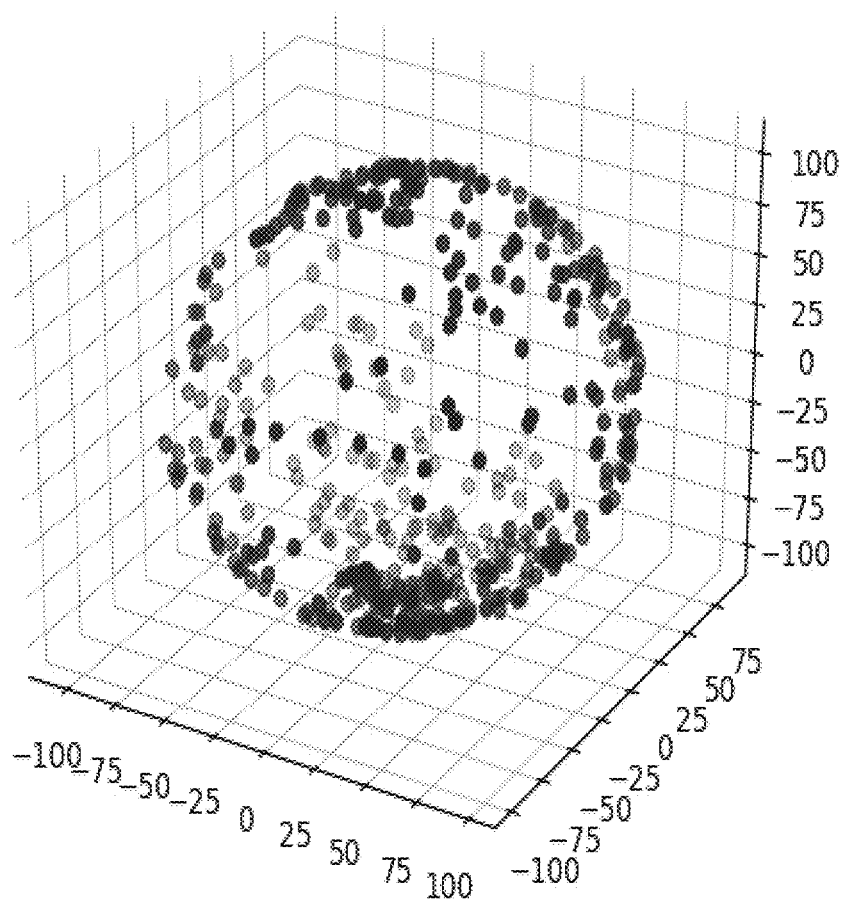
FIG. 13 schematically illustrates a distribution of points on a surface generated by the generative network of a GAN.

More generally, the GAN can learn or postulate any point distribution model (such as the random distribution on a sphere shown in FIG. 13).

Notably, a significant problem for path tracing is generating sample points for a probability/cumulative density/distribution function across a line, hemisphere, or solid angle. When using importance sampling (a variance reduction technique involving sampling a probability distribution such that higher probability events are sampled more often than lower probability events) for improving Monte Carlo integration for solving the bidirectional reflectance distribution function or bidirectional scattering distribution function for path tracing—which attempts to only cast rays from a point on the surface which actually contribute to the accurate physical rendering—the distribution of sample points is extremely important to create realistic reflections/scatters.

Referring now to FIG. 14, this illustrates two surfaces ($A_1$, $A_2$) which have light reflecting off of each other, and the solid angles (hemispheres) which are potential directions for rays of light to interact with the surface.

There are many different traditional methods to generate a distribution of points across a solid angle, such as blue noise, low discrepancy sequences, uniform random distributions and the like. Using such distributions as targets, the GAN can learn these point distributions, and notably can learn a new form of point distribution which takes the best qualities of the different traditional methods presented within the training set. FIG. 13 illustrates a trained GAN generating a distribution of points as a spherical surface.

Using this approach, a GAN can be trained to generate sample points for a solid angle, and hence can be used for generating a distribution of points for importance sampling.

Turning now to FIG. 15, in a summary embodiment of the present disclosure, a digital model repair method comprises:

In a first step s1510, providing a point cloud digital model of a target object as input to a generative network of a trained generative adversarial network 'GAN', the input point cloud comprising a plurality of points erroneously perturbed by one or more causes; and In a second step s1520, generating, by the generative network of the GAN, an output point cloud in which the erroneous perturbation of some or all of the plurality of points has been reduced, wherein the generative network of the GAN was trained using input point clouds comprising a plurality of points erroneously perturbed by said one or more causes, and a discriminator of the GAN was trained to distinguish point clouds comprising a plurality of points erroneously perturbed by said one or more causes and point clouds substantially without such perturbations.

It will be apparent to a person skilled in the art that variations in the above method corresponding to operation of the various embodiments of the method and/or apparatus as described and claimed herein are considered within the scope of the present disclosure, including but not limited to:
- rendering an image responsive to the point cloud output by the generative network of the trained GAN;
- the discriminator of the GAN being first trained on substantially error-free target point cloud data until it can identify this to a predetermined level of accuracy, and the discriminator being secondly trained to discriminate between substantially error free target point cloud data and point cloud data comprising points erroneously perturbed by one or more causes;
- the discriminator being trained to discriminate between substantially error free target point cloud data and point cloud data output by the generative network of the GAN;
- the point cloud data comprising points being erroneously perturbed by one or more causes comprises points erroneously being perturbed by one or more causes selected from the list consisting of Gaussian noise, depth estimation error, and over smoothing at an occlusion boundary;
- the point cloud data comprising points being erroneously perturbed by one or more causes being derived from data obtained by one selected from the list consisting of a stereo camera, a time-of-flight camera, and one or more cameras in conjunction with a structured light projection;
- the generative network outputting a point cloud that corresponds to a subsection of the input point cloud;
- a point cloud input to the generative network of the GAN further comprising additional random points, provided for remapping by the generative network of the GAN to fill one or more gaps in a surface distribution of the point cloud;
- the discriminator being trained to discriminate between substantially error free target point cloud data and point cloud data comprising points erroneously perturbed by one or more causes, the substantially error free target point cloud data being generated by the application of a noise reduction technique to the point cloud data comprising points erroneously perturbed by the one or more causes;
  in this case, the noise reduction technique applying winding numbers to the point cloud;
- target point cloud data including representations of one or more selected from the list consisting of human faces, human bodies or parts thereof, flat surfaces, and geometric primitives or parts thereof; and
- the discriminator being trained to discriminate between substantially error free target point clouds based on a plurality of different point distribution methods, and point cloud data output by the generative network of the GAN.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Accordingly, in a summary embodiment of the present disclosure, a digital model repair apparatus comprises a trained generative adversarial network 'GAN' (for example, generated using CPU 1100 operating under suitable software instruction); input means (such as I/F 1140, RAM 1110 and/or NTMRM 1120) operable to provide a point cloud digital model of a target object as input to a generative network of the trained GAN, the input point cloud comprising a plurality of points erroneously perturbed by one or more causes; and the generative network of the GAN being operable to generate an output point cloud in which the erroneous perturbation of some or all of the plurality of points has been reduced; wherein the generative network of the GAN was trained using input point clouds comprising a plurality of points erroneously perturbed by said one or more causes, and a discriminator of the GAN was trained to distinguish point clouds comprising a plurality of points erroneously perturbed by said one or more causes and point clouds substantially without such perturbations.

The apparatus may then comprise a rendering processor (for example CPU 1100 operating under suitable software instruction) operable to render an image responsive to the point cloud output by the generative network of the trained GAN.

Furthermore the above apparatus may comprise means operable to implement the methods described and claimed elsewhere herein.

It will be appreciated that the above methods may be carried out on conventional hardware suitably adapted as applicable by software instruction or by the inclusion or substitution of dedicated hardware.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A digital model repair method, comprising the steps of:
providing a point cloud digital model of a target object as input to a generative network of a trained generative adversarial network 'GAN', the input point cloud comprising a plurality of points erroneously perturbed by one or more causes; and
generating, by the generative network of the GAN, an output point cloud in which the erroneous perturbation of some or all of the plurality of points has been reduced;
wherein the generative network of the GAN was trained using input point clouds comprising a plurality of points erroneously perturbed by said one or more causes, and a discriminator of the GAN was trained to distinguish point clouds comprising a plurality of points erroneously perturbed by said one or more causes and point clouds substantially without such perturbations, and
wherein the discriminator is trained to discriminate between substantially error free target point cloud data and point cloud data comprising points erroneously perturbed by one or more causes, the substantially error free target point cloud data is generated by the application of a noise reduction technique to the point cloud data comprising points erroneously perturbed by the one or more causes, and the noise reduction technique applies winding numbers to the point cloud.

2. The method of claim 1, comprising: rendering an image responsive to the point cloud output by the generative network of the trained GAN.

3. The method of claim 1, in which
the discriminator of the GAN is first trained on substantially error-free target point cloud data until it can identify this to a predetermined level of accuracy; and
the discriminator is secondly trained to discriminate between substantially error free target point cloud data and point cloud data comprising points erroneously perturbed by one or more causes.

4. The method of claim 3, in which the discriminator is trained to discriminate between substantially error free target point cloud data and point cloud data output by the generative network of the GAN.

5. The method of claim 1, in which point cloud data comprising points erroneously perturbed by one or more causes comprises points erroneously perturbed by one or more causes selected from the list consisting of:
   i. Gaussian noise
   ii. depth estimation error; and
   iii. over smoothing at an occlusion boundary.

6. The method of claim 1, in which point cloud data comprising points erroneously perturbed by one or more causes was derived from data obtained by one selected from the list consisting of:
   i. a stereo camera;
   ii. a time-of-flight camera; and
   iii. one or more cameras in conjunction with a structured light projection.

7. The method of claim 1, in which the generative network outputs a point cloud that corresponds to a subsection of the input point cloud.

8. The method of claim 1, in which a point cloud input to the generative network of the GAN further comprises additional random points, provided for remapping by the generative network of the GAN to fill one or more gaps in a surface distribution of the point cloud.

9. The method of claim 1, in which target point cloud data includes representations of one or more selected from the list consisting of:
   i. human faces;
   ii. human bodies or parts thereof;
   iii. flat surfaces; and
   iv. geometric primitives or parts thereof.

10. The method of claim 1, in which the discriminator is trained to discriminate between substantially error free target point clouds based on a plurality of different point distribution methods, and point cloud data output by the generative network of the GAN.

11. A non-transitory machine-readable medium comprising computer executable instructions adapted to cause a computer system to carry out actions, comprising:
providing a point cloud digital model of a target object as input to a generative network of a trained generative adversarial network 'GAN', the input point cloud comprising a plurality of points erroneously perturbed by one or more causes; and
generating, by the generative network of the GAN, an output point cloud in which the erroneous perturbation of some or all of the plurality of points has been reduced;
wherein the generative network of the GAN was trained using input point clouds comprising a plurality of points erroneously perturbed by said one or more causes, and a discriminator of the GAN was trained to distinguish point clouds comprising a plurality of points erroneously perturbed by said one or more causes and point clouds substantially without such perturbations, and
wherein the discriminator is trained to discriminate between substantially error free target point cloud data and point cloud data comprising points erroneously perturbed by one or more causes, the substantially error free target point cloud data is generated by the application of a noise reduction technique to the point cloud data comprising points erroneously perturbed by the one or more causes, and the noise reduction technique applies winding numbers to the point cloud.

12. A digital model repair apparatus, comprising:
a trained generative adversarial network 'GAN';
input means operable to provide a point cloud digital model of a target object as input to a generative network of the trained GAN, the input point cloud comprising a plurality of points erroneously perturbed by one or more causes; and
the generative network of the GAN being operable to generate an output point cloud in which the erroneous perturbation of some or all of the plurality of points has been reduced;
wherein the generative network of the GAN was trained using input point clouds comprising a plurality of points erroneously perturbed by said one or more causes, and a discriminator of the GAN was trained to distinguish point clouds comprising a plurality of points erroneously perturbed by said one or more causes and point clouds substantially without such perturbations, and wherein the discriminator is trained to discriminate between substantially error free target point cloud data and point cloud data comprising points erroneously perturbed by one or more causes, the substantially error free target point cloud data is generated by the application of a noise reduction technique to the point cloud data comprising points erroneously perturbed by the one or more causes, and the noise reduction technique applies winding numbers to the point cloud.

13. The apparatus of claim 12, comprising: a rendering processor operable to render an image responsive to the point cloud output by the generative network of the trained GAN.

* * * * *